United States Patent [19]
Matsui

[11] Patent Number: 5,959,961
[45] Date of Patent: Sep. 28, 1999

[54] OPTICAL RECORDING MEDIUM HAVING MULTIPLE RECORDING LAYERS AND METHOD FOR RECORDING AND REPRODUCING THEREOF

[75] Inventor: Tsutomu Matsui, Tokyo, Japan

[73] Assignee: NEC Corporation, Tokyo, Japan

[21] Appl. No.: 08/801,988

[22] Filed: Feb. 19, 1997

[51] Int. Cl.⁶ .................................................... G11B 7/24
[52] U.S. Cl. ........................................ 369/275.1; 369/94
[58] Field of Search ..................... 369/275.1, 94, 369/275.2, 275.3, 13, 281, 280, 283, 286

[56] References Cited

U.S. PATENT DOCUMENTS

| | | | |
|---|---|---|---|
| 5,446,723 | 8/1995 | Best et al. | 369/275.1 |
| 5,499,231 | 3/1996 | Fennema et al. | 369/275.1 |
| 5,606,546 | 2/1997 | Best et al. | 369/275.1 |
| 5,615,186 | 3/1997 | Rosen et al. | 369/275.1 |
| 5,764,619 | 6/1998 | Nishiuchi et al. | 369/275.1 |

FOREIGN PATENT DOCUMENTS

| | | |
|---|---|---|
| 59-215044 | 12/1984 | Japan . |
| 61-150148 | 7/1986 | Japan . |
| 61-237247 | 10/1986 | Japan . |
| 62-62448 | 3/1987 | Japan . |
| 63-255830 | 10/1988 | Japan . |
| 63-257946 | 10/1988 | Japan . |
| 1-169753 | 7/1989 | Japan . |
| 291841 | 3/1990 | Japan . |
| 340247 | 2/1991 | Japan . |
| 3-216837 | 9/1991 | Japan . |
| 512751 | 1/1993 | Japan . |
| 5-250755 | 9/1993 | Japan . |
| 7-220320 | 8/1995 | Japan . |
| 8115534 | 5/1996 | Japan . |
| 8221814 | 8/1996 | Japan . |

*Primary Examiner*—Tan Dinh
*Attorney, Agent, or Firm*—Whitham, Curtis & Whitham

[57] ABSTRACT

An optical recording medium is provided, this medium having a first substrate, onto the surface of which is formed a phase-change recording layer, and a second substrate, onto the surface of which is formed a magneto-optical recording layer, these layers being adhered to one another in a manner that causes their surface to be mutually opposing. By providing a means for selectively collecting laser light onto the phase-change recording layer and onto the magneto-optical recording layer, and selecting the output of either a differential amplifier or amplifier, to which are input the received-light outputs from light reflected from the optical recording medium, it is possible to perform access of both the phase-change recording layer and the magneto-optical recording layer, and to perform both recording and playbacking of information at high speed.

12 Claims, 3 Drawing Sheets

OPTICAL RECORDING MEDIUM HAVING MULTIPLE RECORDING LAYERS AND METHOD FOR RECORDING AND REPRODUCING THEREOF

BACKGROUND OF THE INVENTION

1. Field of the Invention

The present invention relates to an optical recording medium such as an optical disk, and more specifically it relates to an optical recording medium with improved recording density, which is formed by the lamination of different recording layers in one and the same recording medium, and a recording/playback apparatus therefor.

2. Description of the Related Art

Research into external memory devices which have the high-speed access ability of a computer magnetic disks have and the large storage capacity of an optical disks have, is progressing at a rapid pace.

It is said to be certain that a next-generation disk apparatus, for reasons such as high-speed transfer rate, high-speed random access, usability of medium with mass-storage memory, and non-contact structure to provide long life, will be an optical disk apparatus. In the past, there have been various types of optical disks, such as magneto-optical disks and phase-change disks, all of these being based on a single recording and playback method, so that one piece of information is recorded at a given location on the disk.

In recent years, to improve the storage capacity of such media, there has been proposed the lamination of recording layers with different information recording/playback methods in one and the same disk, so that by picking up multiple channels of recording information on such recording layers, respectively, it is possible to record two or more pieces of information in the same location on the disk. For example, in Japanese Unexamined Patent Publication (KOKAI) No.63-257946, there is a proposal for one disk a surface of which is divided into at least two areas and an optical recorded layer and a magnetic recording layer are parallely formed in the respective area. In Japanese Unexamined Patent Publication (KOKAI) No. 2-91841, there is a proposal of a disk in which an optical phase-change pit-structure array on which ROM information is registered, is provided on a surface of the disk and an magneto-optical layer, which can store RAM information thereon, is formed on the optical phase-change pit structure array so that the optical phase-change pit structure array and the magneto-optical layer are integrally combined into one disk. Further, in Japanese Unexamined Patent Publication (KOKAI) No. 3-40247 is a proposal of an optical disk of on which a magneto-optical recording layer and Japanese Unexamined Patent Publication (KOKAI) No. 5-12751, is a proposal of a phase-change recording layer are also stacked.

While it is possible, in this manner, by laminating different recording layers, to increase the recording density, in a medium as shown in the Japanese Unexamined Patent Publication (KOKAI) No.63-257946, in which the above-noted optical recording layer and magnetic recording layer are formed on one surface of a disk in respectively separated areas, it is necessary to have separate heads for recording and for playback of information. This makes the optical recording/playback apparatus complex, and in the case of integrating an optical phase-change pit structure with an magneto-optical recording layer, as shown in the Japanese Unexamined Patent Publication (KOKAI) No. 2-91841, it is difficult to overwrite the optical phase-change pit structure.

With regard to this point, there is an advantage to the medium formed by laminating a magneto-optical recording layer and a phase-change recording layer to each other, in that a single optical head can be used for both recording and playback of information.

However, in a range of the Japanese Unexamined Patent Publication (KOKAI) No.3-40247 because the magneto-optical recording layer and the phase-change recording layer are formed in different grooves (tracking grooves) on the disk, respectively, it is not possible at a given location to record both information which should be registered onto each of the recording layers, this being disadvantageous in terms of increasing the storage capacity. In the Japanese Unexamined Patent Publication (KOKAI) No. 5-12751, there is no description of what type of structure the magneto-optical recording layer and the phase-change recording layer are laminated into, the disclosure instead concerning how information different from each other should be registered at the same place but in different recording layers from each other and how it should be playbacked, and not being sufficient to enable practice thereof.

SUMMARY OF THE INVENTION

An object of the present invention is to provide an optical recording medium such as an optical disk, in which there is the practical implementation of a structure formed by the lamination of a magneto-optical recording layer and a phase-change recording layer, and an optical recording/playbacking apparatus which enables the recording of information onto and playback of information from the above-noted medium.

An optical recording medium according to the present invention comprises an optically transparent substrate and an information-recording layer formed on a surface of the optically transparent substrate and the information-recording layer comprising a phase-change recording layer and a magneto-optical recording layer, each being stacked to each other with an interposing optically transparent layer therebetween.

The optical recording medium of the present invention is further characterized in that the information-recording layer provided on the surface of the optically transparent substrate, is formed by laminating the phase-change recording layer, the optically transparent layer and the magneto-optical recording layer in that order with respect to the surface of the optically transparent substrate.

An optical recording medium according to the present invention has a first substrate onto the surface of which is formed a phase-change recording layer, and a second substrate onto the surface of which is formed a magneto-optical recording layer, the above-noted substrates being adhered together by means of an optically transparent material in a manner that their surfaces face one another. In another form, an optical recording medium according to the present invention has an optically transparent substrate, onto the surface of which is formed a phase-change recording layer, onto the top of which is formed a magneto-optical recording layer, with an intervening layer of transparent resin therebetween.

An optical recording/playback apparatus, according to the present invention, uses the above mentioned optical recording medium and further has a laser source which radiates laser light, an objective lens which collects the light from this laser source onto an optical recording medium, means for separating light reflected from the optical recording medium into P-wave and S-wave, a light-receiving element which receiving light of the P-wave and S-wave, a differential amplifier which takes the difference of the outputs of the above-noted light-receiving elements, an amplifier which takes the sum of the outputs of the above-noted light-receiving elements, a control means for performing selective setting control of the light-collection position of the above-noted objective lens with respect to the optical recording layer and the phase-change recording layer, and means for selecting the outputs of the above-noted differential amplifier and above-noted amplifier according to the control operation of the above-noted control means.

DESCRIPTION OF THE PREFERRED EMBODIMENTS

The preferred embodiment of the present invention will be described in detail below, with reference made to the relevant accompanying drawings.

Figure 1:
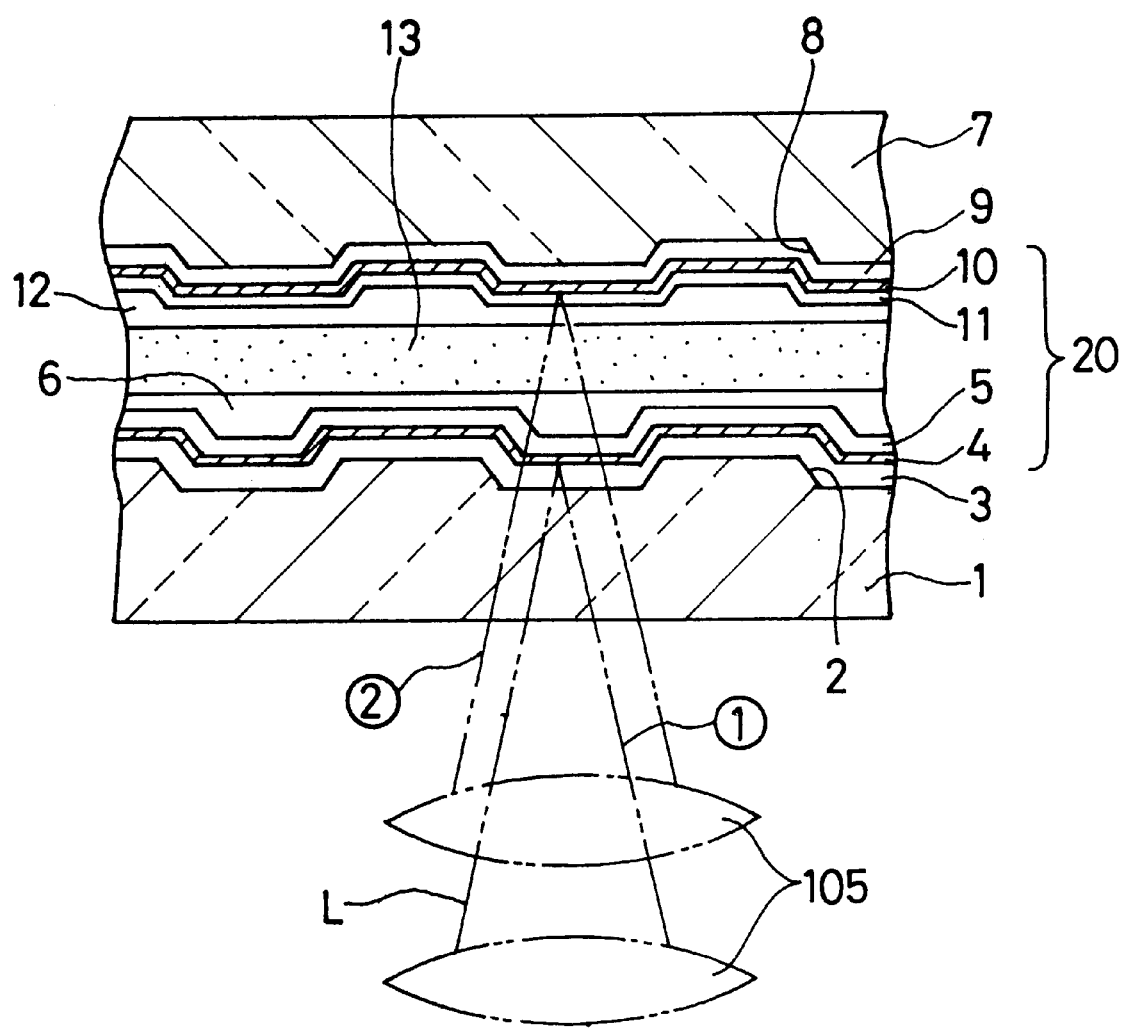
FIG. 1 is a cross-sectional view of the first embodiment of optical recording medium according to the present invention.

FIG. 1 is a cross-sectional view of the first embodiment in which the present invention is applied to an optical disk as an optical recording medium.

In this embodiment, a basic technical construction of an optical recording medium of the present invention is disclosed. Namely, an optical recording medium 100 comprises an optically transparent substrate 1 and an information-recording layer 20 formed on a surface of the optically transparent substrate 1, and the information-recording layer 20 comprising a phase-change recording layer 4 and a magneto-optical recording layer 10, each being stacked to each other with an intervening an optically transparent layer 13 therebetween.

In one of the preferable embodiment of the present inventions, the optical recording medium 100 has the information-recording layer 20 provided on the surface of the optically transparent substrate 1, which is formed by laminating the phase-change recording layer 4, the optically transparent layer 13 and the magneto-optical recording layer 10 in that order with respect to the surface of the optically transparent substrate 1.

And another preferable embodiment of the present invention is such that a suitable protective layer 7 is provided on the surface of the information-recording layer 20 provided on the surface of the optically transparent substrate 1 of the optical recording medium 100.

Next, one example of a method for producing an optical recording medium 100 of the present invention as mentioned above, will be explained hereunder.

In this method, for example, the optical recording medium is made by stacking two substrates produced in a different way, respectively, to each other.

One of the substrates is produced by the following way:

Onto the surface of a polycarbonate first optically transparent round substrate 1 having a thickness of 0.6 to 1.2 mm, a concentrically circular or helical tracking groove 2 is formed, onto the surface of which are laminated a bottom protective film 3 fabricated from $ZnS-SiO_2$ (zinc sulfide-silica), a phase-change recording layer 4 made from GeSbTe (germanium-antimony-tellurium), an upper protective film 5 made from $ZnS-SiO_2$, and a surface protective film 6 made from $ZnS-SiO_2$.

On the other hand, the other of the two substrates is produced by the following way:

Onto the surface a polycarbonate second optically transparent substrate also having a thickness of 0.6 to 1.2 mm, concentric circular or helical tracking groove 8 is formed having a pitch that could be the same as or different than that of the above-noted first substrate 1, onto the surface of which are laminated a lower protective film 9 made of $Zn-SiO_2$, an magneto-optical recording layer 10 made of TbFeCo (terbium-iron-cobalt), a semi-transparent reflective film 11 made of an aluminum thin film or the like, and an upper protective film 12 made of $Zn-SiO_2$.

Then the above-mentioned two substrates are integrated to each other in a way such that on the surface of the first substrate 1 is stacked the second substrate 7, which is oriented in the opposite direction, so that the phase-change recording layer 4 and the magneto-optical recording layer 10 are oppositely arranged to each other and the centers of the substrates 1 and 7 are aligned, with an interposing optically transparent resin 13 forming an optically transparent layer 13 and having a thickness of 0.005 to 0.1 mm, therebetween.

The fact is that the method for producing the optical recording medium of the present invention is not restricted only to the embodiment as mentioned above, but the following method can also be applicable to the present invention in that the optical recording medium is produced by stacking a phase-change recording layer, an optically transparent layer, a magneto-optical recording layer and a protective layer, in any sequential turn with respect to each other, on a substrate 1.

The components as used for the magneto-optical recording layer 10 and the phase-change recording layer 4 used in the present invention are not specifically restricted as mentioned above, but conventionally well-known substances can be used.

Also, the components as used for the optically transparent layer 13 are not specifically restricted as mentioned above but, for example, a resin as called "photo-polymer" is preferably used therefore and, especially, an ultraviolet-hardening resin can desirably be used.

The function of the optically transparent layer 13 is to adhere the phase-change recording layer 4 and the magneto-optical recording layer 10 to each other and to fill a space formed between the two layers as well as to serve as a spacer to set a suitable fixed gauge therebetween.

Note that when a suitable gauge is prepared between the two layers, as described later, a focus point of the laser light can be directed to only one of two layers without effecting any substantially change the other layer and thus the respective information different from each other, can be recorded in a spot area of each one of the above-mentioned two layers adhere to each other and formed in a same area with respect to a surface of the optical recording medium 100, respectively, and thus the different information as separately recorded in a spot area of each one of the above-mentioned two layers and formed in a same area with respect to a surface of the optical recording medium 100, respectively, can be played back.

Further, in the present invention, the information-recording layer 20 of the optical recording medium 100 as formed on the optically transparent substrate 1, is preferably formed by stacking the phase-change recording layer 4, the optically transparent layer 13 and the magneto-optical recording layer 10 in this turn with respect to the surface of the optically transparent substrate 1, as shown in FIG. 1, but the structure is not necessarily restricted only to the above-mentioned construction.

Therefore, in another embodiment of the present invention, the information-recording layer 20 of the optical recording medium 100 can be formed by stacking the magneto-optical recording layer 10, the optically transparent layer 13 and the phase-change recording layer 4 in that order with respect to the surface of the optically transparent substrate 1.

In any embodiment of the present invention, the recording layer as formed adjacently to the optically transparent substrate 1 should be a transparent film layer serving as a half-mirror or a film layer designed to allow a specific light beam to be transmitted therethrough with respect to a light beam power.

Further in the present invention, each of the protective layers 3, 5, 9 and 12 as used in the optical recording medium 100, has a function for adjusting a light absorbing ratio.

A method for optically recording/playbacking information of the optical recording medium 100 and an optical recording/playbacking apparatus of the present invention will be explained hereunder.

In an optical disk as one example of the optical recording medium 100 of the present invention, as shown by the broken line ① in FIG. 1, the laser light L which irradiates the disk from the objective lens 105 of the optical head, to be described later, is collected from the rear side of the first substrate onto the phase-change recording layer 4, thereby enabling the writing of information and the readout of information by a known method. In doing this, the reflective film 11 prevents light which is scattered by the phase-change recording layer 4, for example, from reaching the magneto-optical recording layer 10.

Additionally, as shown by the broken line ② in the above-noted drawing, the laser light is caused to pass through the phase-change recording layer 4 and to be collected at the magneto-optical recording layer 10, thereby enabling the writing and reading of information by a known method. By doing this, it is possible to access information in the phase-change recording layer 4 and magneto-optical recording layer 10 using a single optical head and, because there are only independent changes in light reflectivity and polarization in each of the recording layers, there is no mutual interference between the two layers.

Thus, it is possible to obtain an optical disk with a multiplied information storage capacity by laminating the phase-change recording layer 4 and the magneto-optical recording layer 10.

Figure 2:
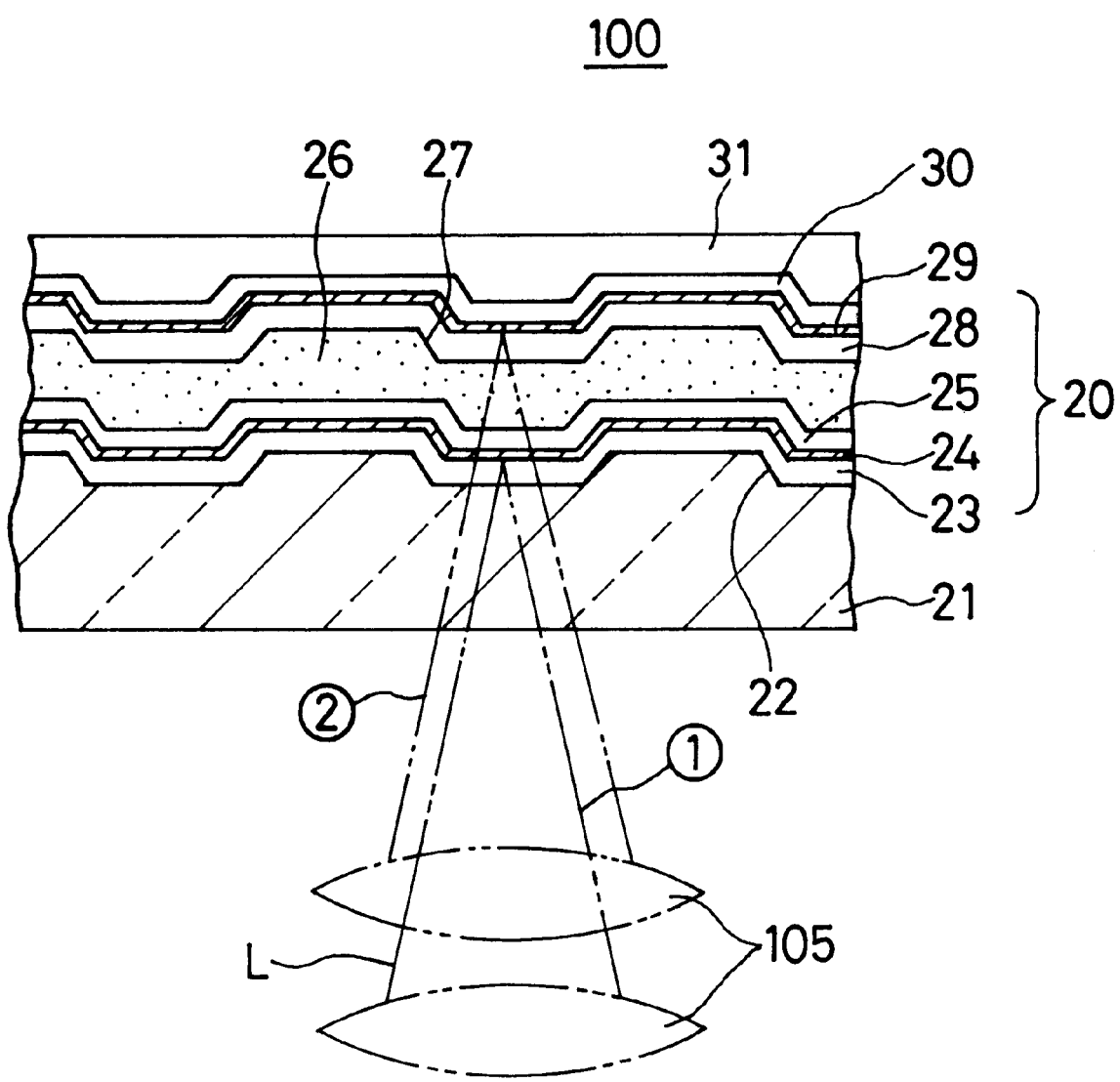
FIG. 2 is a cross-sectional view of the second embodiment of optical recording medium according to the present invention.

FIG. 2 shows a cross-sectional view of the second embodiment of the present invention.

In this embodiment, onto the surface of a polycarbonate optically transparent round substrate 21 having a thickness of 0.6 to 1.2 mm a concentric circular or helical tracking groove 22 is formed, and further onto which are formed a lower protective film 23 made of ZnS-SiO$_2$, a phase-change recording layer 24 made of GeSbTe, and an upper protective film 25 made of ZnS-SiO$_2$.

A photo-polymer 26 is spin-coated to a thickness of 20 to 40μm, this photo-polymer having been pressed by nickel stamp into which is formed a groove under sol condition and irradiated with ultraviolet to make it into a gel condition, thereby forming a tracking groove that has a pitch that is either the same as or different from that of the above-noted tracking groove.

Onto the surface of the above-noted structure is laminated a lower protective film 28 made of ZnS-SiO$_2$, an magneto-optical recording layer 29 made of TbFeCo, an upper protective film 30 made of ZnS-SiO$_2$, and a surface protective film 31 on the uppermost surface, formed by a top coating of ultraviolet-hardening resin.

In this optical disk 100 as well, as shown by the broken line ① in the above-noted drawing, the incident laser light L from the objective lens 105 is collected onto the phase-change recording layer 24 from the rear side of the substrate 21, enabling information access by a known method.

Further, as shown by the broken line ② in the same drawing, the laser light is caused to pass through the phase-change recording layer 24 and to be collected at the magneto-optical recording layer 29, enabling information access by a known means, and thereby providing an optical disk having a multiplied information storage capacity.

As explained above, in the present invention, a tracking groove 2 or 22 is formed on a surface of the substrate 1 or 22, and a groove corresponding to the tracking groove 2 or 22 formed on the substrate 1 or 21 is provided on the surface of the phase-change recording layer 4, 24 or the magneto-optical recording layer 10, 29, and these groove are also used as an area for recording information.

Further in the present invention, a groove corresponding to the tracking groove is also provided on the surface of the optically transparent layer 13 or 26.

In the present invention, as mentioned above, a laser light emitted from a single laser source is caused to strike a main surface of the substrate 1 on which no information-recording layer 20 is formed, so as to radiate the light to any one of the phase-change recording layer 4, 24 or the magneto-optical recording layer 10, 29, to thereby perform recording or playback of predetermined information either one of the phase-change recording layer and the magneto-optical recording layer.

Figure 3:
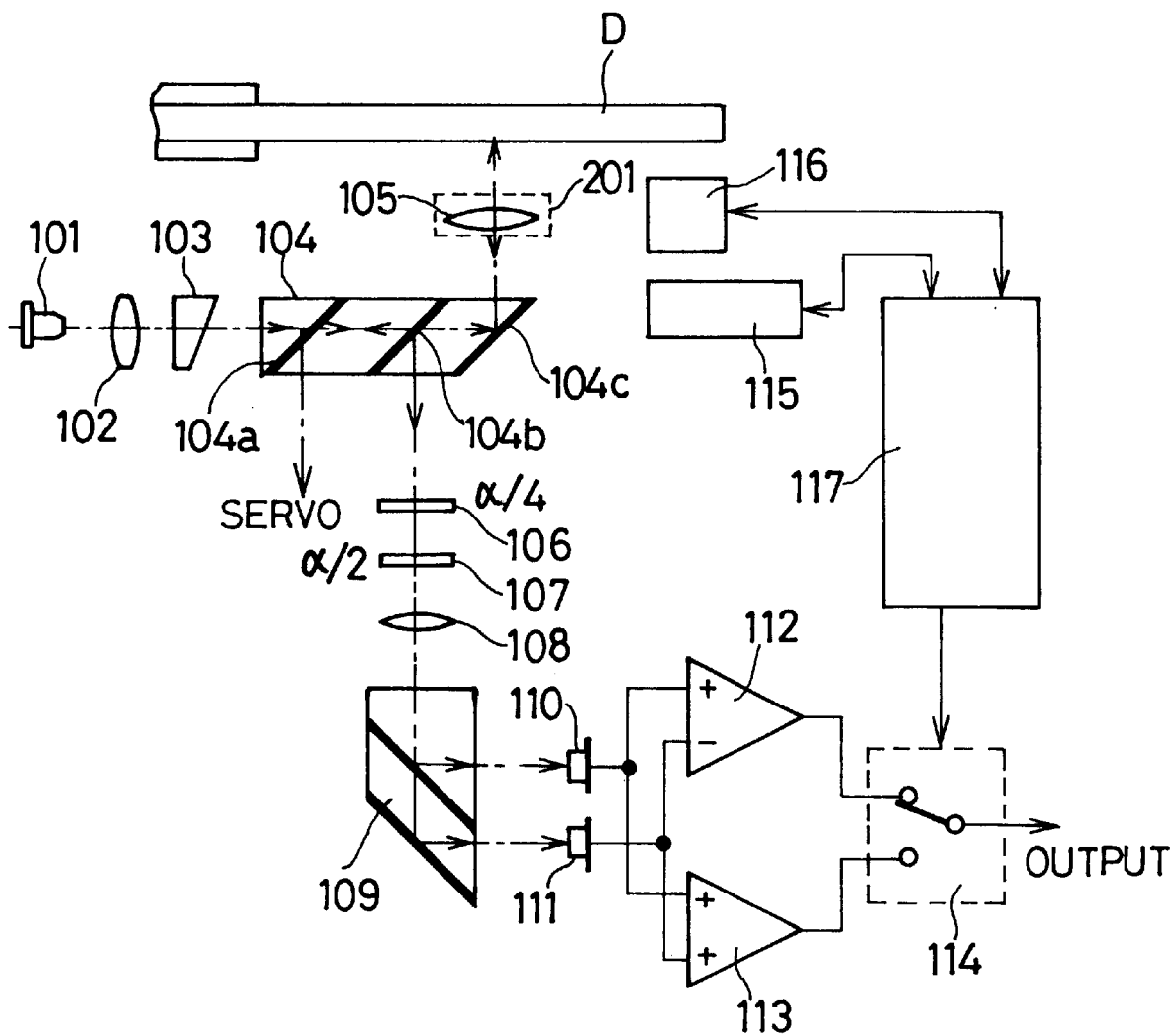
FIG. 3 is a drawing which shows the main structural features of an optical recording/playback apparatus according to the present invention.

FIG. 3 shows the configuration of an embodiment of an optical recording/playback apparatus 200 according to the present invention, in which only the system for reading out information is shown.

The light output from a laser source 101 is collimated by a collimator lens 102 and formed into a circular beam of light by a wedge prism 103. The first splitter surface 104a of a beam splitter 104 provides a servo output to be described later, and the third splitter surface 104c thereof fully reflects the laser light.

This fully reflected laser light strikes an optical disk D such as shown in FIG. 1 or FIG. 2 by an objective lens 105 mounted on a optical head 201 and is collected on each of the recording layers thereof, respectively.

Light which is reflected at the optical disk D is fully reflected by the third splitter surface 104c and fully reflected by the second splitter surface 104b. The fully reflected laser light is passed through the quarter-wavelength plate ( λ/4) 106 and the half-wavelength plate ( λ/2) 107, so that the polarization angle of the P-wave differs from that of the S-wave by 90 degrees, these being collected by a lens 108 on a polarization beam splitter 109, this polarization beam splitter 109 separating the P-wave and S-wave.

The thus-separated P and S waves are received by the light-receiving elements 110 and 111, respectively. The received-light outputs therefrom are input to the differential amplifier 112 and amplifier 113, respectively, the difference of the two waves being obtained at the differential amplifier 112 and the sum of the two waves being obtained by the amplifier 113.

One of the outputs of the differential amplifier 112 and the amplifier 113 is selected by a selector 114.

This optical head 201 is servo controlled by means of a tracking servo-mechanism 115 and a focus servo-mechanism 116 so that a position of the objective lens 105 is suitably adjusted whereby the light radiated from the objective lens 105 strikes the optical disk D at the prescribed location, i.e., a specific area, and is collected onto the prescribed layer there.

The servo control of these servo-mechanism is performed by a control circuit 117 based on the above-noted servo output. This control circuit 117, in addition to performing servo control, drives the above-noted selector 114 so as to select one of the outputs of the above-noted amplifiers 112 and 113.

Therefore, in the above-noted optical recording/playback apparatus, when accessing information on an optical disk based on a phase change, the focus servo-mechanism 116 is servo-controlled so that the laser light is collected on the phase-change recording layers 4 and 24 of the optical disks shown in FIG. 1 or FIG. 2, respectively.

Simultaneous with this, it operates to cause the selector 114 to select the output of the amplifier 113. By doing this, the laser light from the laser source 101 is collected on the phase-change recording layer 4 or 24, the P and S waves of the reflected light therefrom being received by the light-receiving elements 110 and 111, respectively, and the received-light values thereof being added at the amplifier 113. Thus, the change in reflectivity of the laser light at the phase-change recording layers 4 and 24 is detected, whereby readout of information is enabled.

When accessing magneto-optical information on the optical disk, the focus servo-mechanism 116 performs control so that the laser light is collected on the magneto-optical recording layer of the optical disk shown in FIG. 1 or FIG. 2.

Simultaneously, it operates the selector 114 so as to select the output of the differential amplifier 112. By doing this, the light from the laser source 101 is collected on the magneto-optical recording layer 10 or 29, the P and S waves of the reflected light therefrom being received by the light-receiving element 110 and 111, respectively, and the received-light values thereof being subtracted at the differential amplifier 112 which outputs the difference therebetween. Thus, the polarization condition of the laser light at the magneto-optical recording layer is detected, whereby readout of information is enabled.

In this manner, the switching of access to the phase-change recording layer and magneto-optical recording layer can be performed by servo-controlling the optical head 201 by means of the control circuit 117 so as to control the light-collection position of the objective lens 105 and by further selecting the output at the selector 114.

Therefore, it is possible to alternately access the phase-change recording layer and magneto-optical recording layer, or to have continuous access of these recording layers, high-speed access being possible in either case.

While the configuration shown in FIG. 3 is for the purpose of playback of information which has been recorded on an optical disk, it is obvious that, by adding a laser source and a magnetizing means for recording, it is also possible to configure the apparatus as a recording/playback apparatus capable of optical recording as well.

As described above, the basic technical construction of the optical recording/playback apparatus of the present invention is, for example, such that the apparatus comprises an optical recording medium 100 comprising an optically transparent substrate 1 and an recording layer 20 formed on a surface of the optically transparent substrate 1, and which comprises a phase-change recording layer 4 and a magneto-optical recording layer 10 each being stacked on the other an interposing optically transparent layer 13 therebetween, and a means for recording and playback of information having a configuration such that a laser light L emitted from a single laser source is caused to strike a main surface of the substrate 1 on which no information-recording layer 20 is formed, so as to radiate the light to any one of the phase-change recording layer 4 or the magneto-optical recording layer 10, to thereby performing recording or playback of predetermined information in or from either one of the phase-change recording layer 4 and the magneto-optical recording layer 10.

The optical recording/playback apparatus of the present invention is further characterized in that a single laser source which outputs laser light is used and an objective lens mounted in an optical head 201 and which collects and radiates the laser light from the laser source onto an optical recording medium is also provided and further a means for separating the light reflected from the optical recording medium into P-wave and S-wave, light-receiving elements which receive the separated P-wave and S-wave, respectively, a differential amplifier which takes the difference between outputs from the light-receiving elements, an amplifier which takes the sum of outputs from the light-receiving elements, means for selectively setting and controlling the light-collection position of the objective lens with respect to a phase-change recording layer and a magneto-optical recording layer of the optical recording medium, and means for selecting either the output of the differential amplifier or the output of the amplifier, in accordance with the control action of the control means, are provided.

On the other hand, a method for recording and playback of information in or from an information recording layer of the present invention is characterized in that respective information is selectively recorded in one of a first recording layer of a phase-change recording layer and a second recording layer of magneto-optical recording layer of an information-recording layer formed in an optical recording medium, respectively, wherein the recording layer formed on an optically transparent substrate and an recording layer comprising the first recording layer and the second recording layer each being stacked on the other with an interposing optically transparent layer therebetween.

Further, in the method for recording and playbacking information as mentioned above, the respective information as recorded in each one of the first and second recording layers are selectively playbacked from any one of the layers, respectively.

In another words, the method for recording and playbacking information in the present invention is characterized in that a laser light emitted from a single laser source is first caused to strike a main surface of the substrate on which no information-recording layer is formed, and then the laser light is selectively radiated to any one of the first and second recording layers so as either to record respective information in the selected recording layer or to playback respective information as recorded in any one of the first and second recording layers therefrom.

More specifically, the method for recording and playback of information the present invention as mentioned above, comprises the steps of providing an objective lens a focus point of which can be adjusted, at a place opposite to a main surface of the substrate on which no recording layer is formed, and adjusting the focal point of the lens so as to shift a point to which the laser light is collected to either one of the first and second recording layers to thereby record respective information in either one of the first and second recording layers or to thereby playback respective information recorded in either one of the first and second recording layers therefrom.

Further the method for recording and playbacking information the present invention as mentioned above comprises the steps of separating a light reflected from the optical recording medium into P-wave and S-wave, receiving the reflected and separated P-wave and S-wave by the respective light-receiving elements each of which is capable of receiving either one of the separated P-wave and S-wave, respectively, obtaining a first receiving light information by taking the difference between outputs from the both light-receiving elements utilizing a differential amplifier, obtaining a second receiving light information by taking the sum between outputs from the both light-receiving elements utilizing an amplifier, and selecting one of the first and second receiving light information in accordance with information related to the focal point of the objective lens.

As described in detail above, the optical recording medium according to the present invention is formed by a first substrate, onto the surface of which is formed a phase-change recording layer, and a second substrate, onto the surface of which is formed a magneto-optical recording layer, these substrates being stacked together by an optically transparent material so that they face one another, or alternately is formed by an optically transparent substrate, onto the surface of which is formed a phase-change recording layer, a magneto-optical recording layer being formed on the surface thereof, with an intervening layer of transparent resin film, thus providing a single recording medium which enables the recording of information onto both the phase-change recording layer and the magneto-optical recording layer.

An optical recording/playbacking apparatus according to the present invention has a selection means which performs not only selective control of the collection of laser light with respect to the phase-change recording layer and the magneto-optical recording layer of an optical recording medium, but also selection of the outputs from a differential amplifier and an amplifier into which are input the received-light output from light reflected from the optical recording medium, thus enabling access of both the phase-change recording layer and the magneto-optical recording layer and high-speed playback and recording of information on these layers.

What is claimed is:

1. An optical recording and playbacking medium comprising:
   an optically transparent substrate having a main support surface and a main light receiving surface opposite said support surface, and an information-recording layer formed on a main surface of said optically transparent substrate,
   wherein said information-recording layer comprises two sub-recording layers stacked on one another, said two sub-recording layers comprising a phase-change recording layer as a first sub-recording layer directly formed on said main support surface of said optically transparent substrate and a magneto-optical recording layer as a second sub-recording layer stacked on a surface of said first sub-recording layer with an interposing optically transparent layer therebetween, said surface of said first sub-recording medium being opposite to said main support surface of said optically transparent substrate, and wherein said main light receiving surface of said optically transparent substrate receives an externally generated light for recording information into and playbacking information from a selectable one from said first and second sub-recording layers.

2. An optical recording medium according to claim 1, wherein said recording layer provided on the surface of said optically transparent substrate is formed by laminating said phase-change recording layer, said optically transparent layer and said magneto-optical recording layer in that order with respect to said surface of said optically transparent substrate.

3. An optical recording medium according to claim 1, wherein a protective layer is provided on said surface of said information-recording layer provided on the surface of said optically transparent substrate.

4. An optical recording medium according to claim 1, wherein said substrate is a circular optical disk.

5. An optical recording medium according to claim 4, wherein a tracking groove is formed on a surface of said substrate, the area of said groove being used as an information-recording area.

6. An optical recording medium according to claim 5, wherein a groove corresponding to said tracking groove is provided on the surface of said phase-change recording layer or said magneto-optical recording layer.

7. An optical recording medium according to claim 6, wherein a groove corresponding to said tracking groove is provided on the surface of said optically transparent layer.

8. An optical recording medium according to claim 1, wherein said medium is configured such that a laser light striking a light receiving surface of said substrate opposite said main surface, the light having a focal point within the one of said phase-change recording layer and magneto-optical recording layer most proximal to said main surface, radiates said most proximal layer, and such that a laser light striking said light receiving surface of said substrate and having a focal point within the one of said phase-change recording layer and magneto-optical recording layer most distal from said main surface passes through said most proximal layer and radiates said most distal layer, to thereby perform recording or playback of predetermined information to and from, respectively, a selectable one of said phase-change recording layer and said magneto-optical recording layer.

9. An optical recording/playback apparatus comprising:
   an optical recording medium comprising an optically transparent substrate having a main support surface and a main light receiving surface opposite said support surface, and an information-recording layer formed on a main surface of said optically transparent substrate,
   wherein said information-recording layer comprises two sub-recording layers stacked on one another, said two sub-recording layers comprising a phase-change recording layer as a first sub-recording layer directly formed on said main support surface of said optically transparent substrate and a magneto-optical recording layer as a second sub-recording layer stacked on a surface of said first sub-recording layer with an interposing optically transparent layer therebetween, said surface of said first sub-recording medium being opposite to said main support surface of said optically transparent substrate, and wherein said main light receiving surface of said optically transparent substrate receives a laser light for recording information into and playbacking information from a selectable one from said first and second sub-recording layers;

a single laser source which outputs said laser light;

an objective lens which collects and radiates said laser light from said laser source onto said optical recording medium;

means for receiving and separating said light reflected from said optical recording medium into a P-wave and an S-wave;

light-receiving elements which receive said separated P-wave and S-wave, respectively;

a differential amplifier which generates the difference between outputs from said light-receiving elements;

an amplifier which generates the sum of outputs from said light-receiving elements;

control means for selectively setting and controlling a focal point of said objective lens to be selectable between the phase-change recording layer and the magneto-optical recording layer of said optical recording medium; and means for selecting between the output of said differential amplifier and the output of said amplifier, in accordance with the controlled focal point of said control means.

10. A method for recording and playback of information comprising steps of:

emitting a laser light from a single light source;

controlling a focal point of said laser light such that said laser light is selectable between a first and a second focal point;

receiving said laser light at a main light receiving surface of a transparent substrate, said transparent substrate having an information-recording layer on a support surface opposite said main light-receiving surface, said information-recording layer comprising two sub-recording layers stacked on one another, said two sub-recording layers comprising a first sub-recording layer formed of a phase-change recording material and a second sub-recording layer formed of a magneto-optical recording layer stacked on a surface of said first sub-recording layer with an interposing optically transparent layer therebetween, said surface of said first sub-recording medium being opposite to said main support surface of said optically transparent substrate, and wherein said main light receiving surface of said optically transparent substrate receives an externally generated light for recording information into and playbacking information from a selectable one from said first and second sub-recording layers, wherein said laser light is selectively radiated to a selected sub-recording layer from said first and second sub-recording layers to record respective information in the selected recording layer and to playback respective information as recorded in at least one of said first and second recording layers.

11. A method for recording and playback of information according to claim 10, wherein said step of controlling a focal point of said laser light comprises the steps of:

providing an objective lens between said main surface of said substrate; and adjusting a focal point of said lens so as to shift the focal point of the laser light selectable between said first and second recording layers to thereby record respective information selectable between said first and second recording layers and to thereby playback respective information recorded selectable between said first and second recording layers.

12. A method for recording and playback of information according to claim 11, further comprises the steps of:

separating a light reflected from said optical recording medium into a P-wave and an S-wave;

receiving said reflected and separated P-wave and S-wave by respective light-receiving elements, each of which has a surface for receiving at least one of said separated P-wave and S-wave, respectively;

obtaining a first receiving light information by taking the difference between outputs from both light-receiving elements utilizing a differential amplifier;

obtaining a second receiving light information by taking the sum of both outputs from both light-receiving elements utilizing an amplifier; and selecting one of said first and second receiving light information in accordance with information related to the focal point of said objective lens.

* * * * *